Patented Nov. 18, 1930

1,782,384

UNITED STATES PATENT OFFICE

HAROLD W. GREIDER, OF PLYMOUTH MEETING, PENNSYLVANIA, ASSIGNOR TO THE PHILIP CAREY MANUFACTURING COMPANY, A CORPORATION OF OHIO

POROUS MATERIAL AND THE MANUFACTURING PROCESS THEREOF

No Drawing. Original application filed April 18, 1928, Serial No. 271,108. Divided and this application filed June 27, 1929. Serial No. 374,273.

My invention relates to porous materials, particularly building materials and moulded heat insulations and the manufacturing process thereof. It is addressed to increasing the porosity of these products and is a divisional application of my co-pending application Serial No. 271,108 filed April 18, 1928, for improvements in porous materials and the manufacturing process thereof.

Increasing the porosity of the products above mentioned makes them lighter and less dense, reduces their cost and increases their heat insulating efficiency. My invention constitutes a distinct and additional improvement in heat-insulating materials and the manufacturing process thereof, which I have disclosed and claimed in my patent application, Serial No. 89,494, for heat-insulating materials, etc., filed February 19, 1926.

As in my application Serial No. 89,494 above referred to, my invention is applicable particularly to heat insulating materials, whether of magnesia, or magnesia and a binder such as asbestos or other suitable fibrous materials, or a combination of asbestos and plaster of Paris, either with or without a binder, and with or without diatomaceous earth or other suitable finely-divided materials, and generally to all heat insulating materials that are manufactured by mixing the solid materials with water, to form a fluid, or a plastic, or a semi-plastic mass, and then permitting the water to be evaporated. And, as further set forth in said application, I have found that excessive weight in such moulded insulating materials is due largely to a tendency of the minute mineral particle aggregates or flakes in the semi-plastic or fluid mass to compact or shrink under such influences as pressure and drying, so that the mass becomes more dense.

Not only does this compacting of the mineral particle aggregates or flakes add greatly to the weight of the finished material, but it also tends to, and does very largely, decrease the insulating efficiency of the moulded product by closing the minute voids or air spaces between the particles or flakes, upon which the insulating material depends for its efficiency in reducing the heat transfer through the mass.

I have found further that, if the plastic or semi-plastic mixture of the materials above referred to is allowed to stand for any length of time prior to moulding, as is often necessary in commercial operation, there is a pronounced tendency for the material to compact under its own weight, and it also tends to dry out, become lumpy and lose its plasticity, which tends to make the material difficult to mix and mould and which gives a moulded product of considerably increased density.

It is the usual practice in the commercial manufacture of moulded insulation to return to the mix a certain proportion of reground scrap material resulting from broken and damaged moulded insulation and from the trim from the planers and saws used in finishing the moulded shapes to the required dimensions. I have found that, if this reground material, commonly referred to as plastic, is returned to the mix, it has, due to the fact that it has previously been through both moulding and drying operations, considerably greater density than the fresh raw material used in the mix, and for this reason has a very pronounced effect in increasing the density of the final moulded product.

The reground scrap or plastic containing asbestos fibre or other fibrous binder is, when mixed with water to form a semi-plastic mass, usually of a somewhat spongy and lumpy texture, so that it is very difficult to aerate by means of mechanical agitation alone even with the aid of a bubble-forming and stabilizing agent.

My invention seeks to overcome the difficulties above stated and to more effectively decrease the density of moulded heat insulation, by forming within the semi-plastic mass prior to moulding, minute stabilized gas bubbles, said gas bubbles being produced by chemical reaction within the mixture in such a manner as to exert a powerful expanding or disrupting effect upon the spongy, lumpy or fibrous mass, due to the pressure developed within the stabilized gas bubbles as they are formed within the mix.

Since the gas enclosed within the stabilized bubbles is produced by chemical reaction within the mixture, I can produce within the mass a considerably greater proportion of minute bubbles, than it would be possible to introduce by merely mechanically agitating the mixture to entrap air bubbles. Furthermore, since the reacting substance which produces the gas is uniformly distributed and intimately co-mingles with the spongy, lumpy or fibrous materials of the mixture, its expanding or disrupting effect upon the compacted masses will be much greater than that of air bubbles mechanically introduced into the mixture.

I have found that it is advantageous to form minute bubbles in the mixture, because minute bubbles are mechanically much more stable, that is, much stronger than large bubbles, and therefore are not broken down and expelled from the mixture by the pressure used in moulding.

By my invention, I have found that a greater proportion of very minute bubbles can be produced and retained within the same during the moulding process than when bubbles are mechanically introduced into the mixture.

I have found that, by introducing into the material while in a plastic, semi-plastic, or fluid condition, a substance which generates a gas by reaction with the water of the mix, each particle of said substance having a coating of a bubble-forming and stabilizing agent, I can produce a product in which there are created and retained a very large proportion of minute voids. The bubble-forming and stabilizing agent which I use for a coating for the gas-generating substance serves the further important purpose of retarding the reaction between the gas-generating substance and the water of the mix, thus preventing too rapid production of the gas.

The gas-generating substance which I prefer to use is granular or powdered calcium carbide. I have found, however, that calcium carbide cannot be directly mixed successfully with a mixture of insulating materials and water, because the reaction between the calcium carbide and the water, generating acetylene gas, is so violent that it is almost explosive and the gas is lost and no minute stable bubbles are formed within the mix. I therefore use a protective coating for the grains or particles of calcium carbide which retards the reaction between the carbide and the water. While various substances might be used as protective coatings or retarding agents, I have found that bubble-forming and stabilizing agents are particularly effective and serve the purposes stated above; that is, they prevent the gas being generated too rapidly and they stabilize the gas in the mix in the form of very minute bubbles.

I have found that a substance which is to serve satisfactorily as a protective coating for calcium carbide grains for the purposes of my invention must be an organic material which is soluble or colloidally dispersible in water (or which can be rendered soluble or colloidally dispersible in water by reaction with other substances, i. e., alkalies, incorporated in the mix); which is anhydrous, so that it will not itself react with calcium carbide; which is capable of coating the grains of calcium carbide with a virtually continuous, oily, waxy, saponaceous, or resinous protective layer so that, when the carbide is mixed with water, the access of the water to the surfaces of the grains will be so retarded as to permit only a gradual reaction and evolution of acetylene; and which is a bubble-forming and stabilizing agent (or which can be converted into a bubble-forming and stabilizing agent by reaction with other substances, i. e., alkalies, incorporated in the mixture).

I have found that, while many bubble-forming and stabilizing agents meet the above requirements and can be used as protective coatings for calcium carbide grains, the following substances are particularly suited to be used for this purpose according to my invention; sulphonated castor oil, sodium oleate, sodium stearate, sodium resinate, sulphonated oleic acid, sodium sulphoricinoleate, and sodium sulpho-oleate. Other substances which may be used as protective coatings for calcium carbide, which are not themselves bubble-forming and stabilizing agents, but which can be converted into soaps which do function as such agents, by adding to the mix an excess of sodium hydroxide or other caustic alkali, to react with the organic acid, include the following substances: oleic acid, stearic acid, ricinoleic acid, palmitic acid, and rosin (abietic acid).

I have found that the protective coating or retarding agent may be coated on the calcium carbide grains in various ways. While various methods of forming the protective coating on the calcium carbide grains may be used, I have found it advantageous to adapt the method of coating to the properties of the bubble-forming and stabilizing agent used as the coating. If, for example, the coating material is a liquid such as sulphonated castor oil or oleic acid, the carbide may simply be drenched with the liquid and the excess liquid over that required to completely coat the grains may be drained off. If, for example, the coating material is solid at ordinary temperatures, as palmitic acid or rosin, it may be melted and admixed with the calcium carbide in the molten condition. After the mass has cooled and solidified, it may then be pulverized to restore the coated calcium carbide to a granular condition. An alternative method of coating the calcium carbide grains with a bubble-forming and stabilizing agent is to dissolve the agent in a suitable anhydrous volatile organic solvent, such as benzine, gasoline, carbon tetra chloride, or absolute alcohol. The calcium carbide grains are drenched with this solution, and the volatile solvent then permitted to evaporate, leaving a coating of the bubble-forming and stabilizing agent on the surfaces of the carbide grains.

I have found that ordinary lump calcium carbide cannot be successfully used in my improved process. While I do not wish to limit my invention to any particular grain size of calcium carbide, I have found that the results are most satisfactory if relatively fine-grained calcium carbide, having a grain size about that of coarse gunpowder is used.

I have found that, when fine-grained calcium carbide is given a protective retarding coating of a suitable bubble-forming and stabilizing agent, as above stated, and the coated carbide then immersed in water or in a mixture of water and powdered insulating materials, a stable foam or froth is produced in which the bubbles are very minute.

While the successful use of my invention in securing the results stated is not dependent upon the correctness of any theory, which I may advance to explain the functioning of the materials used in the process, I believe that the reason for the very minute size and great stability of the bubbles is that as soon as a small quantity of gas has been released by the carbide reacting with water, it acquires a film of bubble-forming and stabilizing agent from the surface of the carbide grain and a minute stable bubble is formed.

I have heretofore been referring to moulded insulating materials generally and will now, for example, describe my invention as applied in the process and embodied in the product of the manufacture of the magnesia asbestos insulating material commonly called eighty-five per cent. magnesia. I have found that, by adding to the eighty-five per cent. magnesia mix prior to moulding a small quantity of fine-grained calcium carbide which has previously been given a protective retarding coating of a bubble-forming and stabilizing agent, I can produce moulded eighty-five per cent. magnesia having a very great number of minute voids, in excess of the voids which occur in such product when manufactured without the use of the agent, and also in excess of the voids which occur in such product when manufactured with the use of a bubble-forming and stabilizing agent and mechanical agitation to introduce air into the mixture.

The quantity of the coated calcium carbide which I use depends on the micro-porosity required in the final moulded product, as the voids in the product can be increased by using a greater quantity of the calcium carbide or decreased by using a lesser quantity. The quantity of coated calcium carbide which it is permissible to use will also be dependent upon the quality and quantity of the asbestos fibre in the composition, since this fibre gives structural strength to the moulded mass. The quantity of the coated carbide which it is advantageous to use will also depend to a certain extent upon the proportion of reground material or plastic reincorporated in the mix, because the minute stabilized bubbles produced by the carbide are necessary to offset the increased density imparted to the final moulded product by the reground material. I have found that a very satisfactory product of low density can be produced by adding to a mix, containing approximately two thousand pounds of magnesia by dry weight, about two pounds of sodium hydroxide, which dissolves in the water of the mix, followed by about five pounds of calcium carbide, or about 0.25%, which has previously been coated with about two pounds of liquid oleic acid, or 0.1%. I have found that equally satisfactory results are obtained if the five pounds of granular calcium carbide is coated with about two pounds of stearic acid.

I find that my invention can be used successfully in the manufacture of eighty-five per cent. magnesia without altering in any way the usual conditions of mixing and moulding the product. I find that it is advantageous if the mixture of magnesia, asbestos fibre and water is prepared of the same consistency as would be required in the absence of the coated calcium carbide and moulded at the same temperature: about 175° F.

It is a particular advantage of my invention that the generation of gas by calcium carbide does not involve any chemical reaction with the solid insulating materials which are ingredients of the mixture. Such reactions are undesirable because they destroy or modify the structure of the insulating substance.

I find that it is entirely practicable to mold the mixture under substantially the same pressure as is ordinarily used in the moulding of eighty-five per cent. magnesia; that is, between twenty-five and forty pounds per square inch, because this pressure does not break down and expel from the mixture an unduly large proportion of the very minute stable bubbles. When the moulded product is dried in the usual manner, the minute voids thus created and maintained in the moulded product are retained and, as the dried product made according to my invention has a substantially increased number of voids retained, it has lower density and greater insulating efficiency than would be the case without the use of my invention.

I preferably introduce the coated calcium carbide into the mixture in the mixing tank after the mixture has been brought to the required consistency for moulding. In order that the coated calcium carbide grains may be uniformly distributed and intimately commingled with the spongy fibrous and lumpy masses in the mixture, that is, to secure the most effective penetration of these masses by the gas-generating substance, I find that it is advantageous to mix the coated calcium carbide grains very thoroughly with the other ingredients of the mix.

While mechanical agitation, such as described in my pending application Serial No. 89,494 for the formation of minute bubbles within the mix is not essential to my process herein disclosed, it will be understood that it is entirely practicable to use mechanical agitation so that a certain proportion of the air thus introduced into the mix will be enclosed and stabilized in the form of minute bubbles due to the bubble-forming and stabilizing action of the coating agent on the calcium carbide grains.

If a plastic insulating cement is the product desired, it is usually produced by grinding to the desired fineness the trim from the planing of moulded blocks or sectional pipe covering or broken pieces of moulded insulation. I have found that the insulating cement thus made from moulded insulation produced according to my invention is lighter in weight and has greater covering capacity and higher insulating efficiency than similar material produced without its use.

While I have described in detail the application of my invention to the manufacture of eighty-five per cent. magnesia insulation, I have attempted to show and desire to have it understood that it is adapted for use with other porous products which may be made by mixing powdered, granular, flaky, fibrous or pulverulent material with water and then allowing the plastic mass to set by hydration, chemical reaction, or moulding under pressure. My invention also discloses a method of producing a stabilized foam or mass of stabilized bubbles which may be used for various purposes. While, in general, I find it advantageous to produce the minute stabilized bubbles within the plastic mixture, it is entirely feasible to prepare the stabilized foam separately and then incorporate it with suitable materials to increase their porosity.

I claim:

1. The process of making molded heat insulation material of high micro-porosity comprising mixing light finely-divided and/or fibrous inorganic materials with water to form a semi-fluid or plastic mix, dissolving alkali in the water of the mix, generating gas therein by incorporating a finely-divided substance which generates gas by reaction with the water of the mix and which is coated with an oily, resinous, waxy, or organic fatty acid substance, forming a relatively stable foam of minute bubbles containing said gas stabilized by the bubble-forming and stabilizing agent formed by the reaction of the oily, resinous, waxy, or organic fatty acid substance with the alkali of the mix, and molding the mass under pressure with expulsion of water from the mold.

2. The process of making molded heat insulation material of high micro-porosity comprising mixing light finely-divided and/or fibrous inorganic materials with water to form a semi-fluid or plastic water mix, dissolving alkali in the water of the mix, generating gas therein by incorporating finely-divided calcium carbide coated with an oily, resinous, waxy, or organic fatty acid substance, forming a relatively stable foam of minute bubbles containing said gas stabilized by the bubble-forming and stabilizing agent formed by the reaction of the oily, resinous, waxy, or organic fatty acid substance with the alkali of the mix, and molding the mass under pressure with expulsion of water from the mold.

3. The process of making molded heat insulation material of high micro-porosity comprising mixing magnesium carbonate and a fibrous inorganic binder with water to form a semi-fluid or plastic water mix, dissolving alkali in the water of the mix, generating gas therein by incorporating finely-divided calcium carbide coated with an oily, resinous, waxy, or organic fatty acid substance, forming a relatively stable foam of minute bubbles containing said gas stabilized by the bubble-forming and stabilizing agent formed by the reaction of the oily, resinous, waxy, or organic fatty acid substance with the alkali of the mix, and molding the mass under pressure with expulsion of water from the mold.

4. The process of making molded heat insulation material of high micro-porosity comprising mixing magnesium carbonate and asbestos with water to form a semi-fluid or plastic water mix, dissolving alkali in the water of the mix, generating gas therein by incorporating finely-divided calcium carbide coated with oleic acid, forming a relatively stable foam of minute bubbles containing said gas stabilized by the bubble-forming and stabilizing agent formed by the reaction of the oleic acid with the alkali of the mix, and molding the mass under pressure with expulsion of water from the mold.

In testimony whereof, I have signed my name to this specification.

HAROLD W. GREIDER.